United States Patent
Coates

(10) Patent No.: US 8,746,768 B1
(45) Date of Patent: Jun. 10, 2014

(54) FILTER REMOVING TOOL

(71) Applicant: John L. Coates, Perham, MN (US)

(72) Inventor: John L. Coates, Perham, MN (US)

(*) Notice: Subject to any disclaimer, the term of this patent is extended or adjusted under 35 U.S.C. 154(b) by 0 days.

(21) Appl. No.: 14/034,881

(22) Filed: Sep. 24, 2013

(51) Int. Cl.
*B25J 1/02* (2006.01)
*B01D 46/42* (2006.01)

(52) U.S. Cl.
CPC ............... *B01D 46/4227* (2013.01); *B25J 1/02* (2013.01)
USPC ............................................ 294/118; 294/16

(58) Field of Classification Search
USPC ................ 294/16, 28, 31.1, 118, 902; 29/278
See application file for complete search history.

(56) References Cited

U.S. PATENT DOCUMENTS

| | | | | |
|---|---|---|---|---|
| 1,168,919 | A | * 1/1916 | Surface | 425/283 |
| 1,607,204 | A | * 11/1926 | Linzmaier | 294/118 |
| 2,016,356 | A | * 10/1935 | Alberg | 294/118 |
| 2,559,978 | A | * 7/1951 | Marco | 294/28 |
| 2,959,442 | A | * 11/1960 | Kacgebein | 294/31.1 |
| 2,977,150 | A | * 3/1961 | Thomas | 294/118 |
| 3,560,039 | A | * 2/1971 | Gruber | 294/1.3 |
| 3,921,327 | A | * 11/1975 | Casazza | 43/4 |
| 5,405,177 | A | 4/1995 | Goldstein | |
| 5,487,576 | A | 1/1996 | DuVivier | |
| 5,513,889 | A | 5/1996 | Fithen | |
| 5,665,145 | A | 9/1997 | Goodman | |
| 8,075,031 | B2 | 12/2011 | Walker, Jr. | |
| 8,308,209 | B1 | 11/2012 | Bibow | |

* cited by examiner

*Primary Examiner* — Dean Kramer
(74) *Attorney, Agent, or Firm* — Jason L. Gilbert

(57) ABSTRACT

A filter removing tool for aiding with removing an air filter from a housing, such as a furnace. The filter removing tool generally includes a pair of handles, each having a linkage portion extending therefrom. The respective linkage portions cross each other and are interconnected via a pivot pin so that the handles may be opened or closed. A first arm extends from the first linkage portion and a second arm extends from the second linkage portion, each of the arms including a gripping member, at their respective distal ends. Each gripping member includes an inwardly-extending flange which is adapted to grasp the outer frame of a filter to aid its removal from a housing.

4 Claims, 7 Drawing Sheets

FILTER REMOVING TOOL

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a filter tool and more specifically it relates to a filter removing tool for aiding with removing an air filter from a housing, such as a furnace.

2. Description of the Related Art

Any discussion of the related art throughout the specification should in no way be considered as an admission that such related art is widely known or forms part of common general knowledge in the field.

Air filters are commonly used in connection with home or business furnaces to remove dust and other particulate material from air before it flows through the building in which the furnace is installed. Generally, the air filter is comprised of a filter having an outer housing which is positioned within a slot of the furnace. The upper end of the filter is generally flush with, or slightly beneath, the upper end of the slot of the furnace.

Because of the positioning of the filter, it is often difficult to remove the filter from its slot. Typically, in the past, an individual has been forced to manually grasp the upper end of the filter with his/her fingers to remove from the furnace slot. Such a method can be difficult depending on the size of the individual's fingers. There are also implicit risks involved with sticking one's fingers into any portion of a furnace, such as being cut by metal or being burned.

Because of the inherent problems with the related art, there is a need for a new and improved filter removing tool for aiding with removing an air filter from a housing, such as a furnace.

BRIEF SUMMARY OF THE INVENTION

The invention generally relates to a filter removing tool which includes a pair of handles, each having a linkage portion extending therefrom. The respective linkage portions cross each other and are interconnected via a pivot pin so that the handles may be opened or closed. A first arm extends from the first linkage portion and a second arm extends from the second linkage portion, each of the arms including a gripping member, at their respective distal ends. Each gripping member includes an inwardly-extending flange which is adapted to grasp the outer frame of a filter to aid its removal from a housing.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
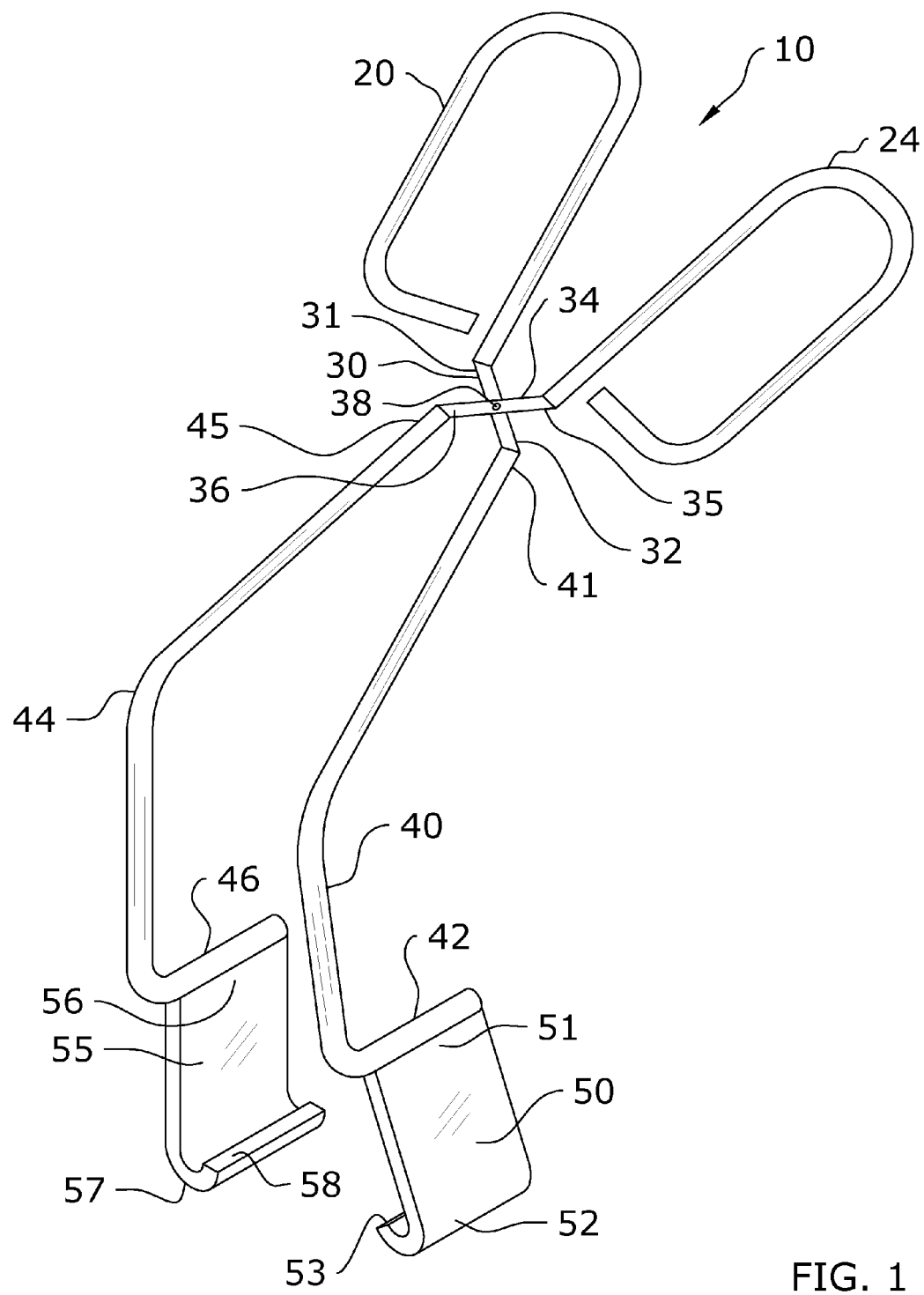
FIG. 1 is a frontal upper perspective view of the present invention.
Figure 2:
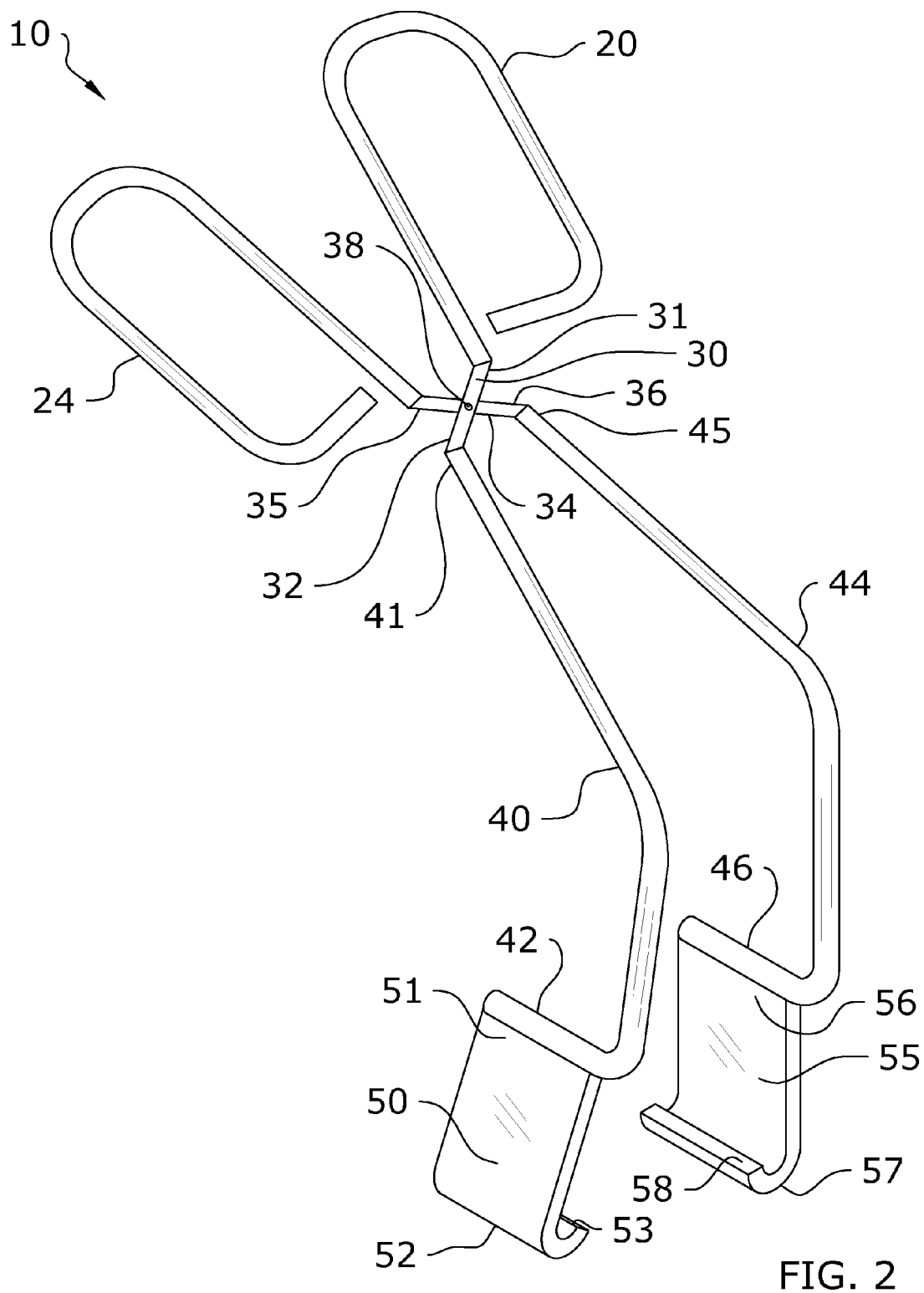
FIG. 2 is a rear upper perspective view of the present invention.
Figure 3:
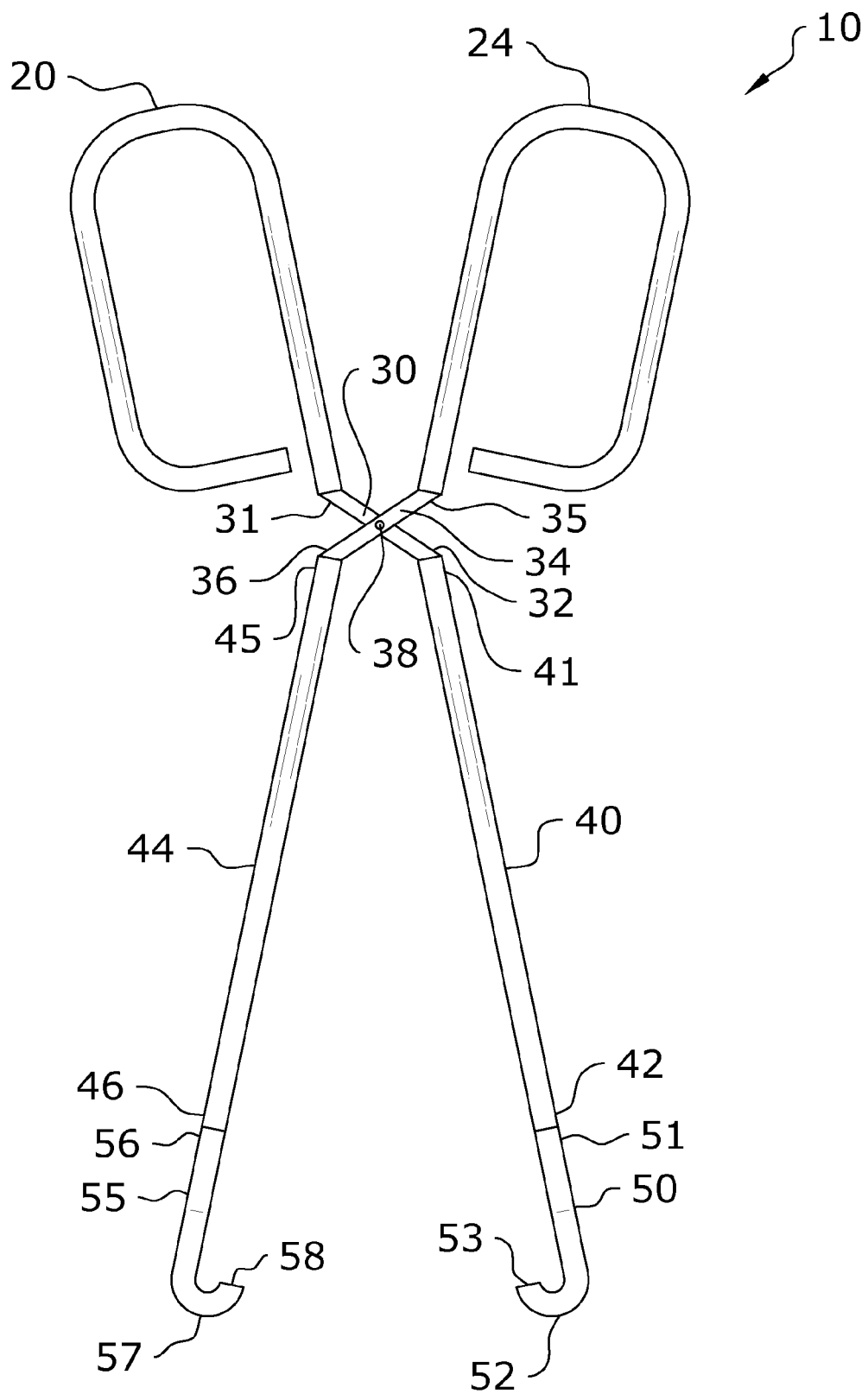
FIG. 3 is a frontal view of the present invention.
Figure 4:
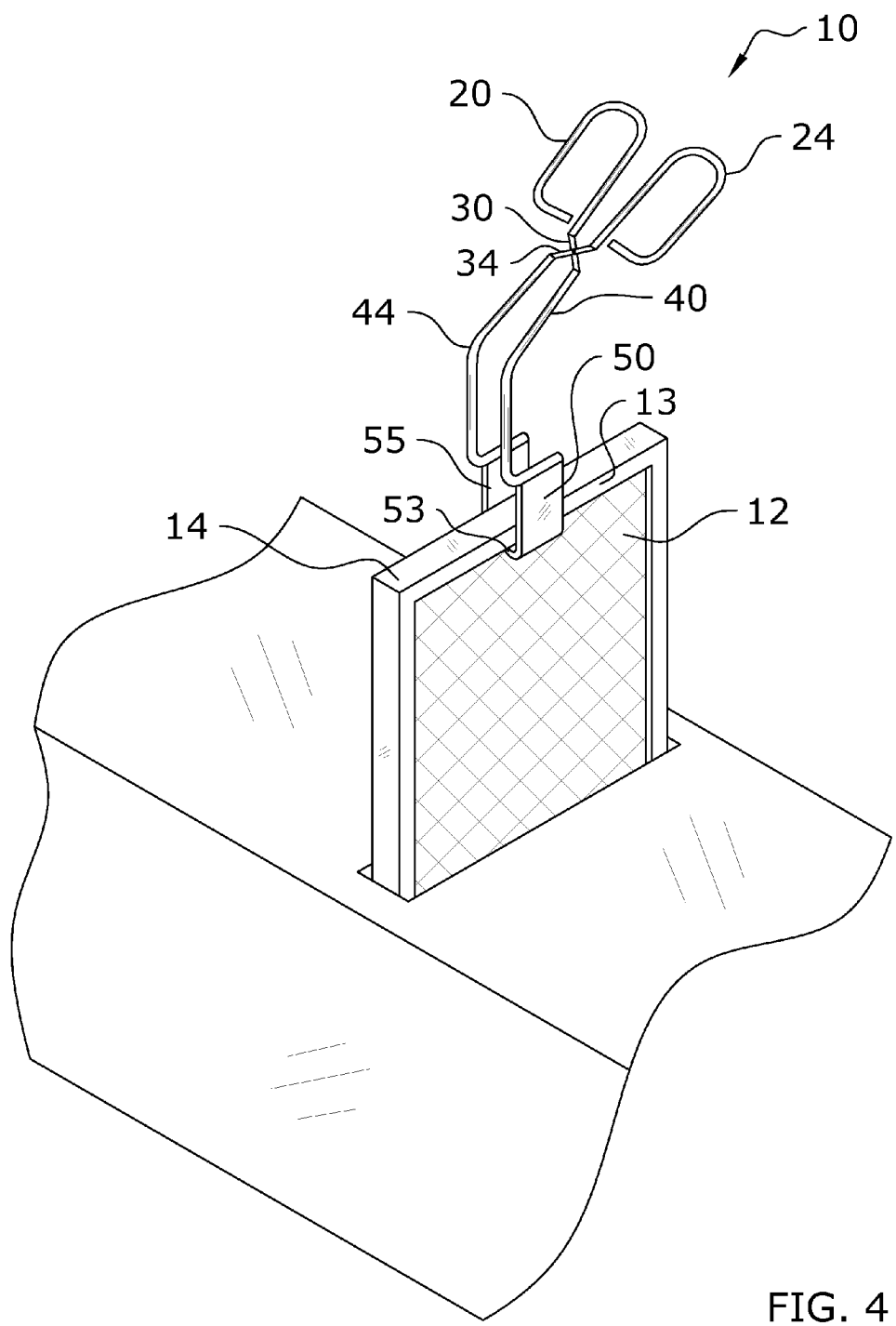
FIG. 4 is an upper perspective view of the present invention in use.
Figure 5:
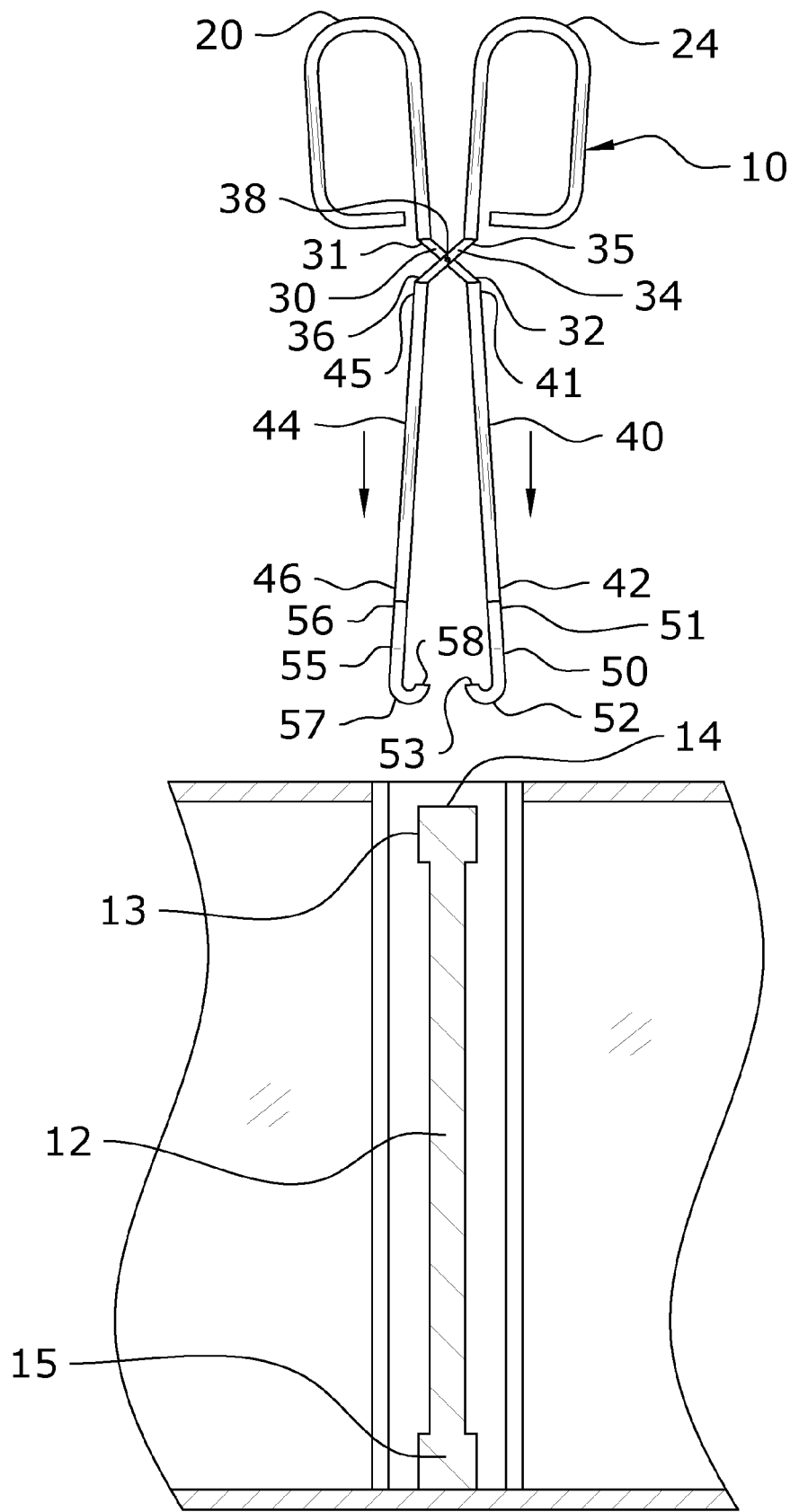
FIG. 5 is a first side sectional view of the present invention in use.

A. Overview.

Turning now descriptively to the drawings, in which similar reference characters denote similar elements throughout the several views, FIGS. 1 through 7 illustrate a filter removing tool 10, which comprises a pair of handles 20, 24, each having a linkage portion 30, 34 extending therefrom. The respective linkage portions 30, 34 cross each other and are interconnected via a pivot pin 38 so that the handles 20, 24 may be opened or closed. A first arm 40 extends from the first linkage portion 30 and a second arm 44 extends from the second linkage portion 34, each of the arms 40, 44 including a gripping member 50, 55 at their respective distal ends 42, 46. Each gripping member 50, 55 includes an inwardly-extending flange 53, 58 which is adapted to grasp the outer frame 13 of a filter 12 to aid its removal from a housing.

B. Filter Removing Tool.

As shown throughout the figures, the present invention is generally comprised of a filter removing tool 10 having a first handle 20 and a second handle 24. The handles 20, 24 may be comprised of various configurations, such as the looped structure shown in the figures. The figures hereto are exemplary in nature, and thus the scope of the present invention should not be construed as being limited to any particular handle configuration.

The handles 20, 24 are adapted to be grasped by a user of the present invention and manipulated to control the arms 40, 44 and gripping members 50, 55 thereof when the present invention is in use. In some embodiments, the handles 20, 24 may be ergonomically designed or may be covered with a plastic coating as shown in the figures to improve comfort while using the present invention.

The handles 20, 24 are each connected to a linkage portion 30, 34 which links the handles 20, 24 with the arms 40, 44 of the present invention. Generally, a first linkage portion 30 will be secured to the first handle 20 and a second linkage portion 34 will be secured to the second handle 24. In some embodiments, the linkage portions 30, 34 may be integrally formed of a unitary structure with the handles 20, 24. In other embodiments, they may be discrete structures.

The first linkage portion 30 will be secured at its first end 31 to the first handle 20 and at its second end 32 to the first arm 40 of the present invention. The second linkage portion 34 will be secured at its first end 35 to the second handle 24 and at its second end 36 to the second arm 44.

The linkage portions 30, 34 cross each other as shown throughout the figures and are linked together via a pivot member 38, generally comprised of a pivot pin 38. The pivot member 38 acts to pivotally secure the first linkage portion 30 to the second linkage portion 34 as shown in the figures. Thus, the handles 20, 24 may be manipulated to open or close the gripping members 50, 55 of the present invention as described below.

The present invention includes a first arm 40 extending from the first linkage portion 30 and a second arm 44 extending from the second linkage portion 34. Each arm 40, 44 is comprised of an elongated member extending for a length from the respective linkage portions 30, 34 as shown throughout the figures. A first end 41 of the first arm 40 extends from the second end 32 of the first linkage portion 30 and a first end 45 of the second arm 44 extends from the second end 36 of the second linkage portion 34.

The respective arms 40, 44 may be comprised of a curved configuration as shown in the figures so as to ease accessing the filter 12 as shown in the figures. Preferably, each arm 40, 44 will bend inwardly at least 45 degrees at a point approximately ¾ along the length of each arm 40, 44 as is best shown in FIG. 1. Thus, a first portion of each arm 40, 44 which will extend in a first direction from the linkage portions 30, 34 and a second portion of each arm 40, 44 will extend in a second direction at an angle with respect to the first portion. The bend in each arm 40, 44 will aid with positioning of the gripping members 50, 55 to grasp the filter 12.

The distal end 42, 46 of each arm 40, 44 includes a gripping member 50, 55 for aiding in gripping a filter 12 to remove it from a furnace or other housing as shown in the figures. Generally, the second end 42 of the first arm 40 will be linked with a first end 51 of a first gripping member 50. Similarly, the second end 46 of the second arm 44 will be linked with a first end 56 of a second gripping member 55. In some embodiments, the arms 40, 44 and gripping members 50, 55 may be integrally formed of a unitary structure. In other embodiments, they may be comprised of discrete structures secured to each other.

Each gripping member 50, 55 is comprised of an elongated member having a flange 53, 58 extending from its respective second end 52, 57 as shown throughout the figures. The first gripping member 50 will include a first flange 53 positioned at its distal end 52 and the second gripping member 55 will include a second flange 58 at its distal end 57. The flanges 53, 58 are adapted to hook onto the outer frame 13 of a filter 12 to aids its removal from its housing as discussed below. While the figures illustrate rounded flanges 53, 58, it is appreciated that a wide range of configurations may be utilized both for the gripping members 50, 55 and the flanges 53, 58. The flanges 53, 58 will preferably extend inwardly from the respective distal ends 52, 57 of the gripping members 50, 55.

C. Operation of Preferred Embodiment

Figure 6:
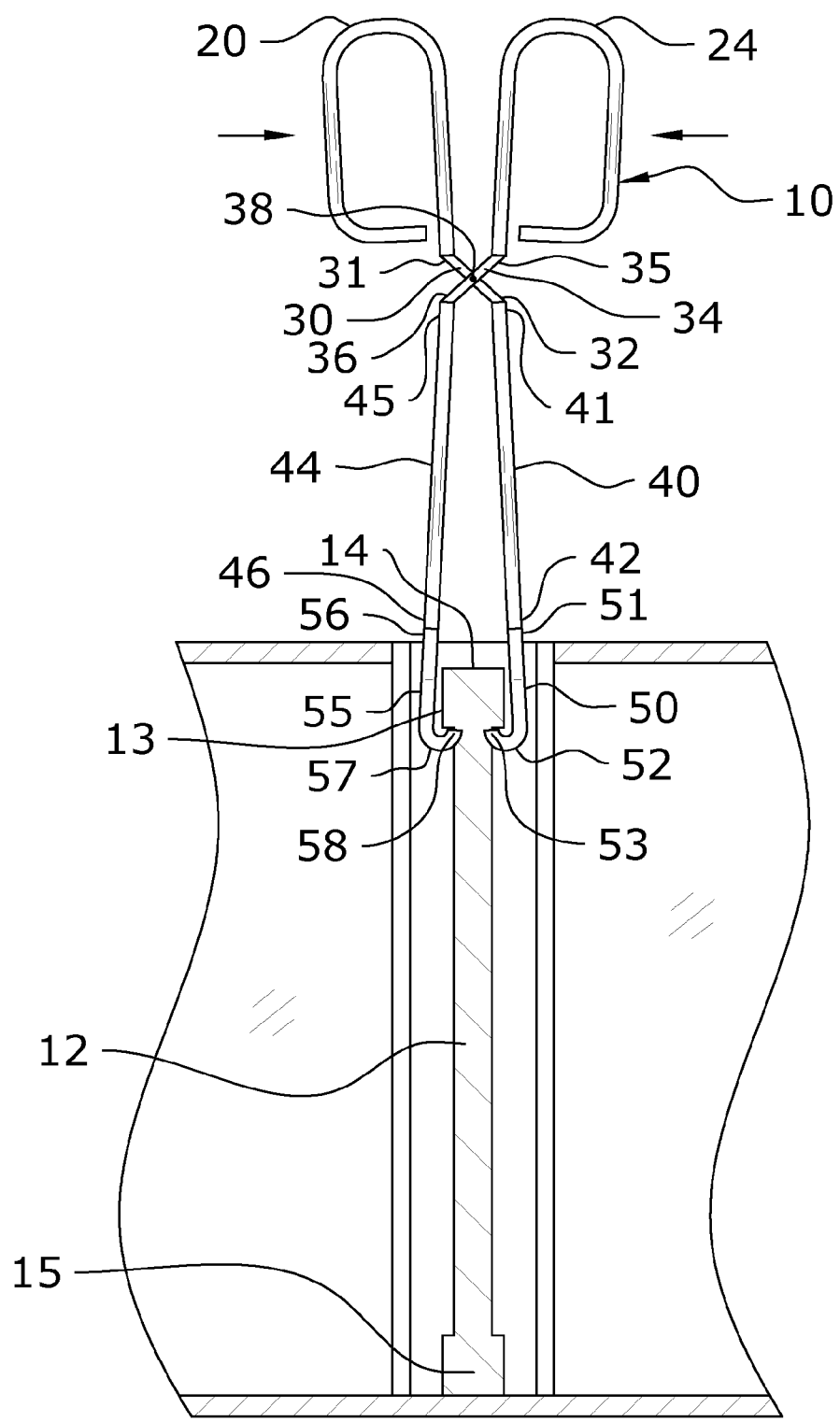
FIG. 6 is a second side sectional view of the present invention in use.
Figure 7:
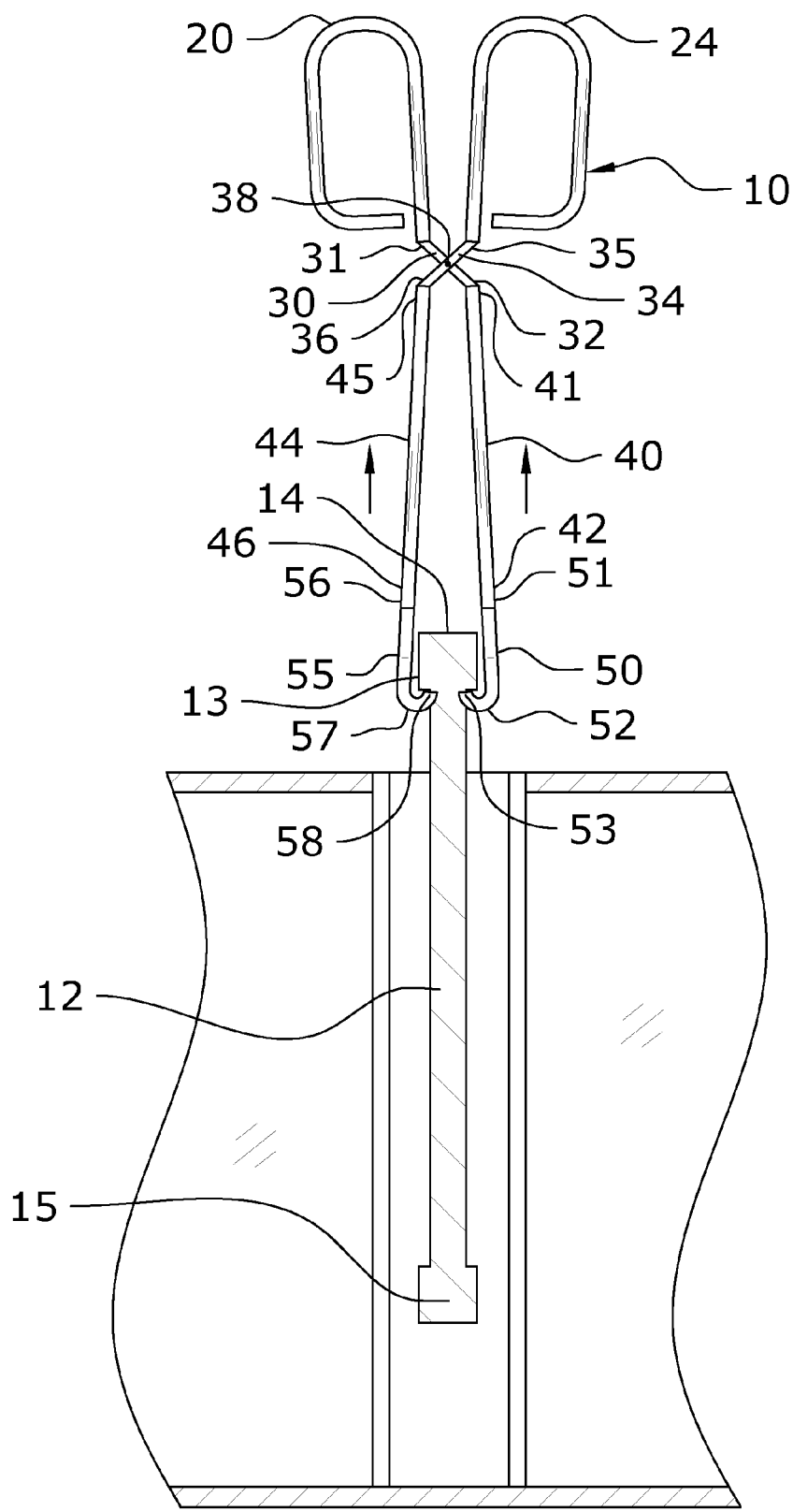
FIG. 7 is a third side sectional view of the present invention in use.

In use, the filter 12 will have been previously positioned within a housing. When the filter 12 becomes soiled, it will need to be replaced. The user will grasp the filter removing tool 10 by the handles 20, 24. By pulling the handles 20, 24 apart, the gripping members 50, 55 will open up. The opened gripping members 50, 55 may then be positioned to surround the outer frame 13 of the filter 12 at its upper end 14. With the gripping members 50, 55 so positioned, the handles 20, 24 may be pressed together to secure the upper end 13 of the outer frame 13 of the filter 12 between the gripping members 50, 55 as shown in FIG. 6. The flanges 53, 58 will engage with the outer frame 13 to ease removal of the filter 12. The tool 10 may then be pulled upward to remove the filter 12, including both its upper end 14 and lower end 15, from the housing as shown in FIG. 7.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A filter removing system, comprising:
   a furnace, said furnace including a filter slot;
   an air filter positioned within said filter slot, said air filter including an outer frame;
   a first handle;
   a second handle;
   a first linkage portion extending from said first handle;
   a second linkage portion extending from said second handle, wherein said first linkage portion and said second linkage portion are pivotally interconnected by a pivot member;
   a first arm extending from said first linkage portion, wherein said first arm includes a first portion extending in a first direction from said first linkage portion and a second portion extending in a second direction from said first portion of said first arm;
   a second arm extending from said second linkage portion, wherein said second arm includes a first portion extending in a first direction from said second linkage portion and a second portion extending in a second direction from said first portion of said second arm;
   a first gripping member extending from said first arm, said first gripping member including a first flange adapted to grasp said outer frame of said filter; and
   a second gripping member extending from said second arm, said second gripping member including a second flange adapted to grasp said outer frame of said filter.

2. The filter removing system of claim 1, wherein said handles, said linkage portions, said arms, and said gripping members are integrally formed of a unitary structure.

3. The filter removing system of claim 1, wherein said second portion of said first arm extends at at least a 45 degree angle with respect to said first portion of said first arm and wherein said second portion of said second arm extends at at least a 45 degree angle with respect to said first portion of said second arm.

4. The filter removing system of claim 3, wherein said first flange extends inwardly from said first gripping member and wherein said second flange extends inwardly from said second gripping member.

* * * * *